（12）United States Patent
Kimura et al.

(10) Patent No.: US 7,427,014 B2
(45) Date of Patent: Sep. 23, 2008

(54) SHELF TAG, SHELF TAG MANUFACTURING SYSTEM, METHOD AND PROGRAM FOR MANUFACTURING SHELF TAG AND STORAGE MEDIUM

(75) Inventors: Seiji Kimura, Shiojiri (JP); Yasuhiro Nomura, Shiojiri (JP)

(73) Assignee: Seiko Epson Corporation (JP)

( * ) Notice: Subject to any disclaimer, the term of this patent is extended or adjusted under 35 U.S.C. 154(b) by 184 days.

(21) Appl. No.: 11/350,353

(22) Filed: Feb. 8, 2006

(65) Prior Publication Data

US 2006/0175415 A1 Aug. 10, 2006

(30) Foreign Application Priority Data

Feb. 9, 2005 (JP) ............................. 2005-033296

(51) Int. Cl.
*G06F 17/00* (2006.01)
(52) U.S. Cl. ...................... 235/375; 235/383; 235/385; 283/81
(58) Field of Classification Search ................ 235/375, 235/383, 385, 487; 705/20–22, 28; 283/81
See application file for complete search history.

(56) References Cited

U.S. PATENT DOCUMENTS

| 5,537,312 | A  | * | 7/1996  | Sekiguchi et al. ............. 705/14 |
| 2002/0109593 | A1 | * | 8/2002  | Swartzel et al. ............ 340/540 |
| 2006/0283942 | A1 | * | 12/2006 | Nagamachi ................. 235/383 |
| 2007/0023511 | A1 | * | 2/2007  | Smith et al. ................. 235/385 |

FOREIGN PATENT DOCUMENTS

| JP | 11-306436 | 5/1999 |
| WO | WO 98/52143 | * 11/1998 |

* cited by examiner

*Primary Examiner*—Edwyn Labaze
(74) *Attorney, Agent, or Firm*—Harness, Dickey & Pierce, P.L.C.

(57) ABSTRACT

A shelf tag to be attached to a display shelf for displaying commercial products, includes: a commercial product name and a price of the commercial product and a dimensional value indicating a display position of the commercial product to be displayed in a row direction on the display shelf printed on the tag.

12 Claims, 9 Drawing Sheets

FIG. 1

| 25a | 25b | 25c | 25d |
|---|---|---|---|
| COMMERCIAL PRODUCT CODE | COMMERCIAL PRODUCT NAME | PRICE | COMMERCIAL PRODUCT DIMENSION |
| J001 | ROSE BOUQUET | 800yen | 17.5cm |
| J002 | CHRYSANTHEMUM BOUQUET | 380yen | 18.0cm |
| ⋮ | ⋮ | ⋮ | ⋮ |

| 25a | 26a |
|---|---|
| COMMERCIAL PRODUCT CODE | FILE NAME |
| J001 | IMAGE FILE J1 |
| J002 | IMAGE FILE J2 |
| ⋮ | ⋮ |

FIG. 3

| 25a | 27a | 27b | 27c | 27d | 27e |
|---|---|---|---|---|---|
| COMMERCIAL PRODUCT CODE | SHELF NO | RAIL LENGTH | DISPLAY SEQUENCE | NUMBER OF COMMERCIAL PRODUCT TO BE DISPLAYED | DISPLAY POSITION |
| J001 | T | 90cm | FIRST | TWO ROWS | 0cm |
| J002 | T | 90cm | SECOND | TOW ROWS | 35cm |
| ⋮ | ⋮ | ⋮ | ⋮ | ⋮ | ⋮ |

SHELF TAG, SHELF TAG MANUFACTURING SYSTEM, METHOD AND PROGRAM FOR MANUFACTURING SHELF TAG AND STORAGE MEDIUM

BACKGROUND

1. Technical Field

The present invention relates to an inventory tag suitable to be used as an auxiliary shelf tag which aids commercial product display work, a shelf tag manufacturing system, a method of manufacturing shelf tags, a program for manufacturing shelf tags and a storage medium storing the same.

2. Related Art

In the related art, commercial product display work is generally performed, for example, in a sequence of displaying respective commercial products in sequence from the left on a display shelf, and then attaching the shelf tags for the respective commercial projects on a rail corresponding to positions of the commercial products in the shelf. However, in this sequence, since the positions where the commercial products are displayed cannot be figured out accurately at the time of the display work. Therefore, the commercial products must be displayed by guess, and hence the display work is inefficient. In order to improve such a circumstance, in a structure disclosed in JP-A-11-306436, the efficiency of the display work is improved by zoning the display shelf into a plurality of shelves, assigning shelf numbers to the respective shelves, attaching the shelf tags manufactured on the basis of the shelf numbers on the shelf, and then displaying the commercial products.

However, in the structure disclosed in JP-A-11-306436, since it is necessary to zone the display shelf into the plurality of shelves for each commercial product, when displaying a plurality of commercial products on the display shelf in the row direction, this structure cannot be employed unless the display shelf is zoned in the row direction. Therefore, the display work is inefficient depending on the type of the display shelf and hence the problem which is suffered from in the related art is still carried down in this connection.

SUMMARY

An advantage of some aspects of the invention is to provide a shelf tag, a shelf tag manufacturing system, a method and a program of manufacturing the shelf tag, and a storage medium that can aid improvement of efficiency of commercial product display work.

In order to achieve the above described advantage, a first aspect of the invention is a shelf tag to be attached to a display shelf for displaying commercial products at least including a commercial product name and a price of the commercial product and a dimensional value indicating a display position of the commercial product to be displayed in a row direction on the display shelf printed thereon.

In this arrangement, since the dimensional value indicating the display position is printed on the shelf tag together with the commercial product name and the price of the commercial product, even when the display shelf is not zoned in the row direction, the display work can be performed with high efficiency while figuring out the display position of the commercial product by attaching the shelf tag to the display shelf on the basis of the display position printed on the shelf tag and then displaying the commercial product at the position of the shelf tag Preferably, the dimensional value indicating the display position of the commercial product is an absolute position from one end of the display shelf in the row direction or a dimensional value indicating a relative position between the adjacent commercial products.

In this arrangement, the shelf tag can be attached accurately to a position corresponding to the display position of the commercial product in question on the basis of the display position printed as the absolute value from one end (left end or the right end) of the display shelf or the dimensional value indicating the relative position among the commercial products.

Preferably, the shelf tag is formed to have a length corresponding to a display range of the commercial products to be displayed in the row direction.

In this arrangement, since the shelf tag is formed to have a length corresponding to the display range of the commercial products, the commercial product display can be performed with the length of the shelf tag attached to the display shelf as a rough standard. Accordingly, the display work can be performed with high efficiency.

A second aspect of the invention is a shelf tag to be attached to a display shelf for displaying commercial products, the shelf tag being formed into an elongated rectangular of a length corresponding to a row of the display shelf and including at least commercial product names and prices of a plurality of the commercial products for one row that are to be displayed on the display shelf in the row direction, at least the commercial product names and prices being printed at positions corresponding to the display positions where the respective commercial products are to be displayed.

In this arrangement, the commercial product names and the prices of the respective commercial products to be displayed on the display shelf in one row are printed on the shelf tag at positions corresponding to the display positions of the respective commercial products. In other words, in this arrangement, the shelf tags for the respective commercial products to be displayed on the display shelf in one row are printed in a lump on the shelf tag of the elongated rectangular shape having a length corresponding to the length of the display shelf. In this type of the shelf tag, even though the display shelf is not zoned in the row direction, the display work can be performed with high efficiency while figuring out the display positions of the commercial products by attaching the shelf tag to the display shelf and then displaying the commercial products at positions where the commercial product names and the prices of the respective commercial products are printed.

Preferably, advertisement information of a shop that sells the commercial product or a manufacturer that supplies the commercial product is further printed on the shelf tag. In this arrangement, since the advertisement information is printed on the shelf tag, the shelf tag with high added value is provided.

Preferably, background patterns or background colors set according to the commercial products, the display shelves, or manufacturers that supply the products are printed on the shelf tag.

In this arrangement, the background pattern or the background color is printed on the shelf tag according to the product, the display shelf or the supply manufacturer of the product. Therefore, for example, by changing the background color according to the product or the manufacturer, the products can be distinguished easily, and the efficiency of the display work can be performed with high efficiency.

Preferably, the image of the commercial product is further printed on the shelf tag. In this arrangement, since the commercial product image is further printed, the products can be distinguished easily, and the efficiency of the display work can be performed with high efficiency.

Preferably, the shelf tag is manufactured using a roll sheet as a printing medium.

By manufacturing the shelf tag using the roll sheet as the printing medium, manufacture of the shelf tag is preferably facilitated.

A third aspect of the invention is a shelf tag manufacturing system for manufacturing shelf tags to be attached to a display shelf for displaying commercial products including: means for calculating a display position of the commercial product to be displayed in a row direction on the basis of a display sequence of the commercial products to be displayed on the display shelf in the row direction, the number of the commercial products to be displayed and the dimension of the commercial products, means for creating shelf tag data including at least a name and a price of the commercial product and a dimensional value showing the display position arranged thereon; means for converting the shelf tag data to print data; and means for printing the shelf tag on the basis of the print data.

In this arrangement, the dimensional value indicating the display position of the commercial product calculated on the basis of the display sequence, the number of commercial products to be displayed, and the dimension of the commercial product is printed on the shelf tag together with the name and the price of the commercial product. Accordingly, even though the display shelf is not zoned in the row direction, the display work can be performed with high efficiency while figuring out the display position of the commercial product by attaching the shelf tag to the display shelf on the basis of the display position printed on the shelf tag and then displaying the commercial product at the position of the shelf tag.

Preferably, the shelf tag data is manufactured to have a length corresponding to a display range of the commercial products to be displayed in the row direction.

In this arrangement, since the shelf tag is formed to have the length corresponding to the display range of the commercial products, the commercial product display work can be performed in reference to the length of the shelf tag attached to the display shelf as a rough standard. Accordingly, the display work can be performed with high efficiency.

A fourth aspect of the invention is a shelf tag manufacturing system for manufacturing shelf tags to be attached to a display shelf for displaying commercial products including: means for calculating a display position of the commercial product to be displayed in a row direction on the basis of a display sequence of the commercial products to be displayed on the display shelf in the row direction, the number of commercial products to be displayed, and dimension of the commercial product; means for creating shelf tag data including names and prices of a plurality of commercial products to be displayed on the display shelf in one row arranged at positions corresponding to the display positions of the respective commercial products in a length corresponding to one row of the display shelf; means for converting the shelf tag data into print data; and means for printing the shelf tag on the basis of the print data.

In this arrangement, the shelf tag includes the names and the prices of the respective commercial products to be displayed on the display shelf in one row printed thereon at positions corresponding to the display positions of the respective commercial products. In other words, in this arrangement, the shelf tags for the respective commercial products in one row of the display shelf in a lump on the shelf tag of an elongated rectangular shape having a length corresponding to the length of the display shelf. With the shelf tag in this type, even through the display shelf is not zoned in the row direction, the display work can be performed with high efficiency while figuring out the display positions of the commercial products by attaching the shelf tag to the display shelf and then displaying the commercial products at positions where the names and the prices of the respective commercial products are printed.

A fifth aspect of the invention is a method of manufacturing shelf tags to be attached to a display shelf for displaying commercial products including: a step of calculating display position of the commercial product to be displayed in a row direction on the basis of a display sequence of the commercial products to be displayed on the display shelf in the row direction, the number of the commercial products to be displayed and dimension of the commercial products, a step of creating shelf tag data including at least a name and a price of the commercial product and a dimensional value showing the display position arranged thereon; a step of converting the shelf tag data to print data; and a step of printing the shelf tag on the basis of the print data.

According to this method, the dimensional value indicating the display position of the commercial product calculated on the basis of the display sequence of the commercial products, the number of commercial products to be displayed and the commercial product dimension is printed on the shelf tag together with the name and price of the commercial product. Accordingly, even though the display shelf is not zoned in the row direction, the display work can be performed with high efficiency while figuring out the display position of the commercial product by attaching the shelf tag to the display shelf on the basis of the display position printed on the shelf tag, and then displaying the commercial products at position of the shelf tag.

A sixth aspect of the invention is a program implemented by a computer for manufacturing a shelf tag to be attached to a display shelf for a displaying commercial product and causing the computer to execute processing including; calculating a display position of the commercial product to be displayed in a row direction on the basis of a display sequence of the commercial products to be displayed on the display shelf in the row direction, the number of the commercial products to be displayed and dimension of the commercial products; creating shelf tag data including at least a name and a price of the commercial product and a dimensional value showing the display position arranged thereon; converting the shelf tag data to print data; and printing the shelf tag on the basis of the print data.

According to this program, the dimensional value indicating the display position of the commercial product calculated on the basis of the display sequence of the commercial products, the number of commercial products to be displayed and the commercial product dimension is printed on the shelf tag together with the name and price of the commercial product. Accordingly, even though the display shelf is not zoned in the row direction, the display work can be performed with high efficiency while figuring out the display position of the commercial product by attaching the shelf tag to the display shelf on the basis of the display position printed on the shelf tag, and then displaying the commercial products at position of the shelf tag.

A seventh aspect of the present invention is a storage medium storing a program implemented by a computer for manufacturing a shelf tag to be attached to a display shelf for displaying a commercial product, the program causing the computer to execute processing including: calculating a display position of the commercial product to be displayed in a row direction on the basis of a display sequence of the commercial products to be displayed on the display shelf in the row direction, the number of the commercial products to be displayed and dimension of the commercial products; creating shelf tag data including at least a name and a price of the commercial product and a dimensional value showing the display position arranged thereon; converting the shelf tag data to print data; and printing the shelf tag on the basis of the print data.

According to the program provided by the storage medium, the dimensional value indicating the display position of the commercial product calculated on the basis of the display sequence of the commercial products, the number of commercial products to be displayed and the commercial product dimension is printed on the shelf tag together with the name and price of the commercial product. Accordingly, even though the display shelf is not zoned in the row direction, the display work can be performed with high efficiency while figuring out the display position of the commercial product by attaching the shelf tag to the display shelf on the basis of the display position printed on the shelf tag, and then displaying the commercial products at position of the shelf tag.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
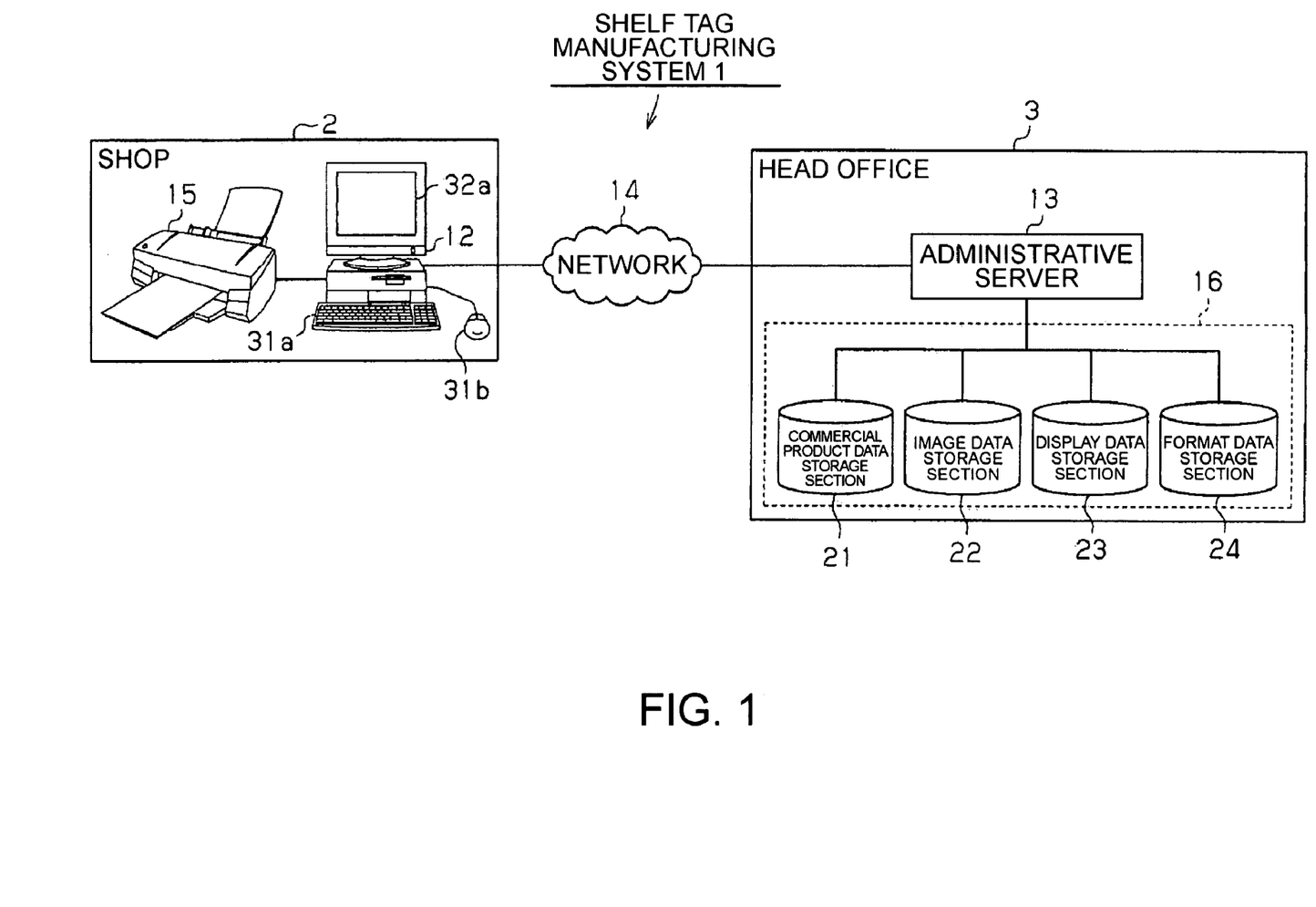
FIG. 1 is a schematic block diagram showing a shelf tag manufacturing system according to a first embodiment of the invention.

Referring now to the drawings, a first embodiment of the invention will be described. FIG. 1 is a schematic block diagram showing a shelf tag manufacturing system 1 according to this embodiment. The shelf tag manufacturing system 1 (computer system) manufactures shelf tags 100 (FIG. 9) described later and controls various data using a database of a computer, and in this example, the system is built on the basis of a relational data model of a client/server system.

The shelf tag manufacturing system 1 includes a shop terminal 12 as a client computer installed in a shop 2, and an administrative server 13 as a server computer installed in, for example, a head office 3 of the shop 2. The shop terminal 12 and the administrative server 13 are connected to each other via a network 14 (for example, internet).

The administrative server 13 is configured to have an integrative server function including functions of a web server and an FTP server. Data transmission between the administrative server 13 and the shop terminal 12 is performed according to a predetermined communication protocol (for example, TCP/IP). In this example, a mode in which the server functions are integrated in a single administrative server 13 is employed. However, the mode of decentralization/integration of the server of the server function is not limited thereto, and it may be configured in an arbitrary unit such as decentering/integrating all or part of the server functions functionally or physically according to a load or the like.

The shop terminal 12 is composed, for example, of a personal computer. A printer 15 of, for example, a color inkjet type is connected to the shop terminal 12. The printer 15 prints the shelf tags based on print data created by the shop terminal 12 described later. Although FIG. 1 shows only one of the shop terminals 12, one or more of the shop terminals 12 are installed in the respective shops 2.

A database 16 in which various data required for manufacturing the shelf tag is connected to the administrative server 13. The database 16 includes a commercial product data storage section 21, an image data storage section 22, a display data storage section 23, and a format data storage section 24. In this example, the database 16 is decentered by functions to the respective storage sections 21 to 24. However, the invention is not limited to the mode of the decentralization described above.

Figure 2:
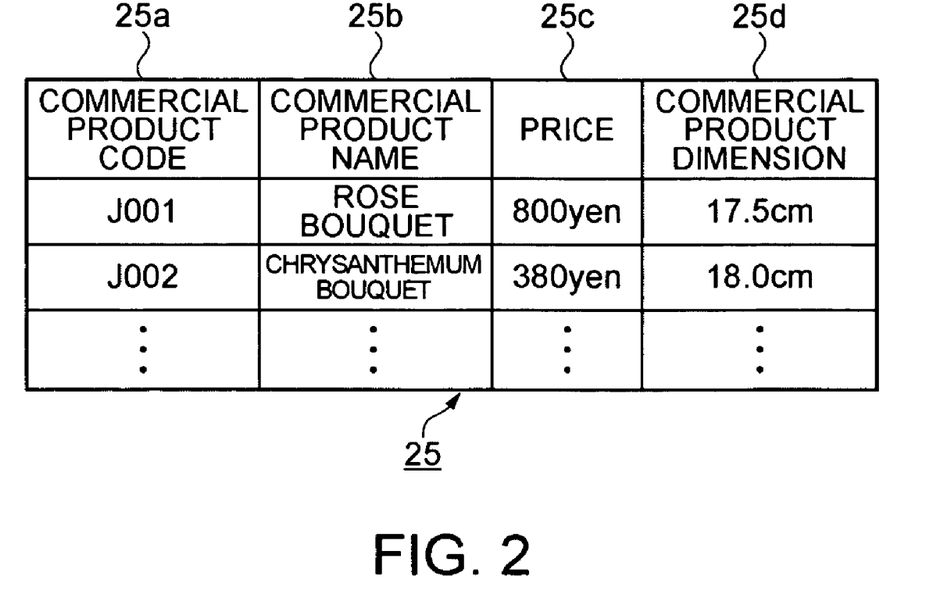
FIG. 2 is a conceptual drawing showing a structure of a database.
Figure 9:
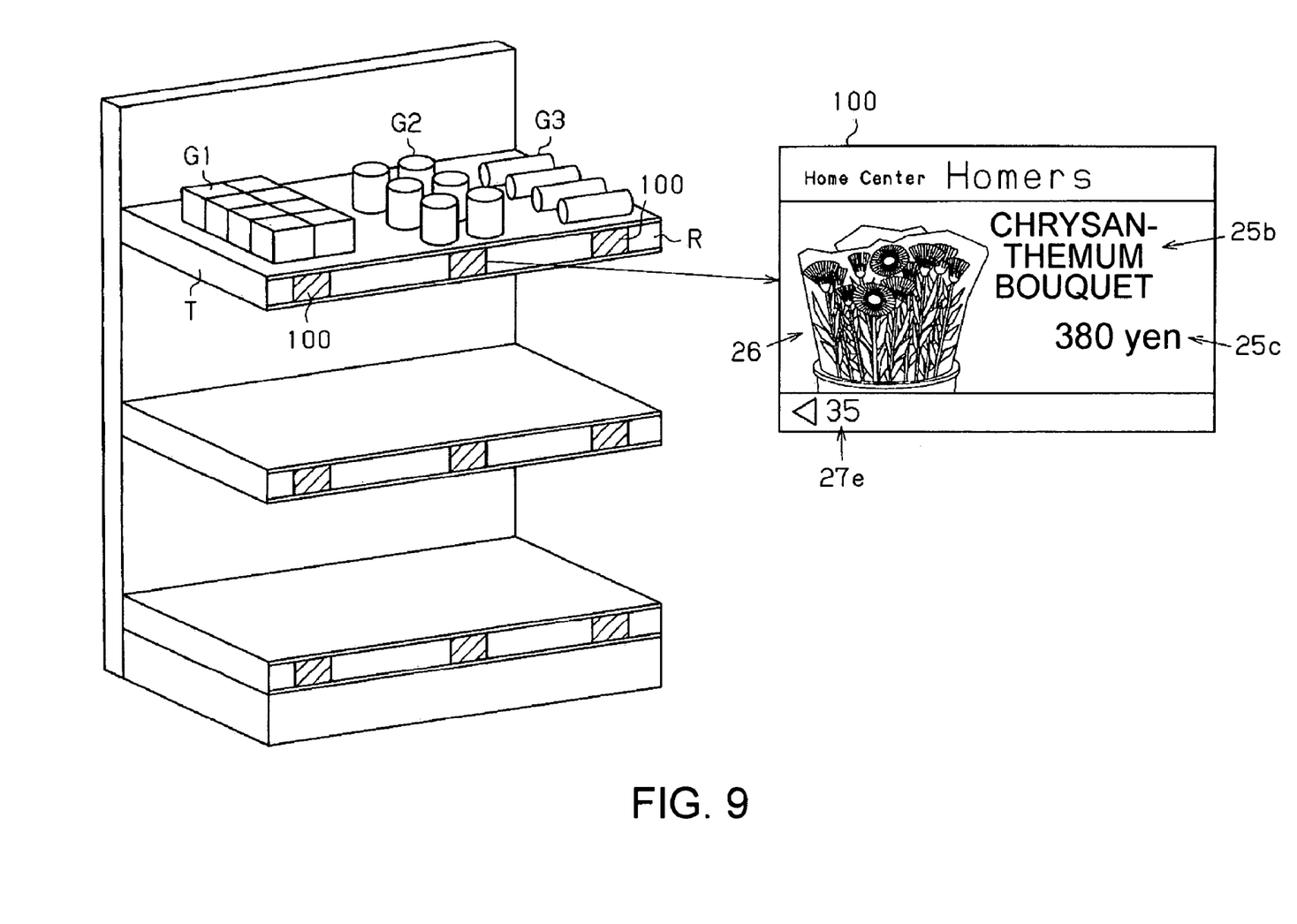
FIG. 9 is a pattern diagram showing a usage of the shelf tag.

The commercial product data storage section 21 stores commercial product data 25 of commercial products to be displayed on a display shelf T (see FIG. 9). As shown in FIG. 2, the commercial product data 25 is composed of a commercial product code 25$a$, a commercial product name 25$b$, a price 25$c$, and commercial product dimension 25$d$ in this example. The commercial product code 25$a$ is data for identifying a commercial product and is composed of alphabets and numerals of a predetermined number of digits. The commercial product name 25$b$ is data indicating an appellation of the commercial product and is composed of text data. The price 25$c$ is price data indicating a price of the commercial product. The commercial product dimensions 25$d$ is numerical data indicating a width of the commercial product (the length in the longitudinal direction of a rail R of the display shelf T), and is represented by a dimensional unit of centimeter in this example.

Figure 3:
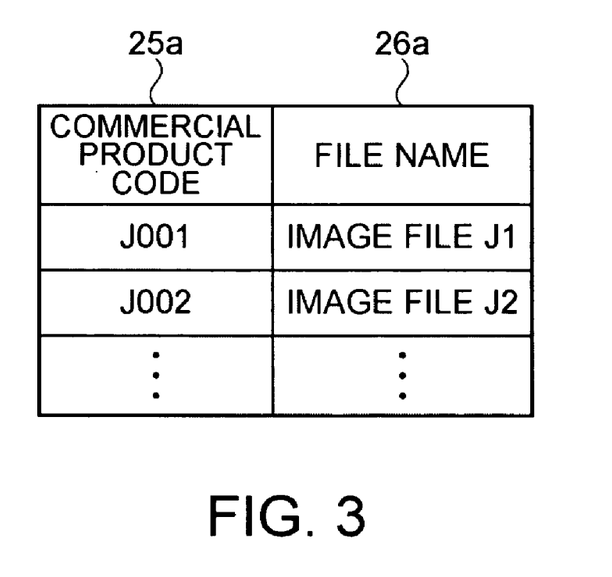
FIG. 3 is a conceptual drawing showing the structure of the database.

The image data storage section 22 stores an image file 26$a$ which stores a commercial product image 26 (see FIG. 9) of the commercial product. More specifically, as shown in FIG. 3, the image files 26$a$ of the respective commercial products are stored in association with the commercial product code 25$a$ of the same commercial product. The commercial product image 26 is composed of photograph image data (color image) in this example, and is stored in a contracted scale which can be printed on the shelf tag.

Figure 4:
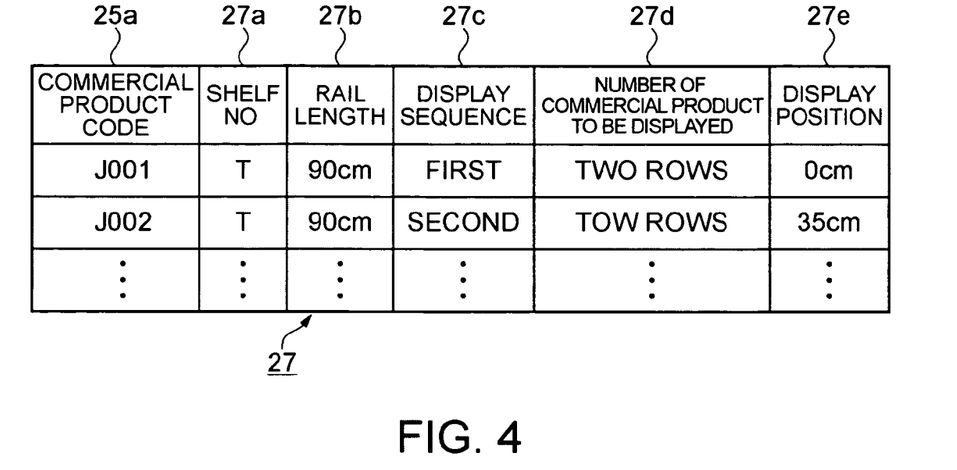
FIG. 4 is a conceptual drawing showing the structure of the database.

The display data storage section 23 stores display data 27 of the commercial product to be displayed on the display shelf T. As shown in FIG. 4, the display data 27 is stored in association with the commercial product code 25$a$ of the commercial product, and in this example, is composed of a shelf number 27$a$, a rail length 27$b$, a display sequence 27$c$, a number of commercial products to be displayed 27$d$, and a display position 27$e$. The shelf number 27$a$ is data for identifying the display shelf T of the commercial product, and is composed of alphabets and numerals of a predetermined number of digits. The rail length 27b is a numerical data indicating a width of the display shelf T for one row (that is, the length of the rail R), and is represented by a dimensional unit of centimeter in this example. The display sequence 27c is data indicating the display sequence of the commercial product in the display shelf T, and in this example, indicates the display sequence from the left end with reference to the left end of the display shelf T (the left end in a state of viewing toward the display shelf). The number of commercial product to be displayed 27d is numerical data indicating the number of commercial product to be displayed in the row direction in the display shelf T.

The display position 27e is numerical data indicating a position to start display of the commercial product in the display shelf T, and indicates a distance (absolute position) from the left end of the display shelf T by a dimensional unit of centimeter in this example. More specifically, the display position 27e is calculated on the basis of the display sequence 27c of a commercial product, the commercial product dimension 25d of a commercial product displayed on the left side of the corresponding commercial product and the number of commercial products to be displayed 27d. However, as regards the product which is set to the "first" commercial product as the display sequence 27c, the display position 27e is set to "0 (cm)". In other words, the commercial product displayed at the leftmost position in the respective display shelf T is set to "0 (cm)" in its display position 27e, and as regards commercial products displayed on the right side thereof, the display position 27e thereof is determined on the basis of the commercial product dimension 25d and the number of commercial products to be displayed 27d of the commercial products displayed on the left side thereof.

Figure 5:
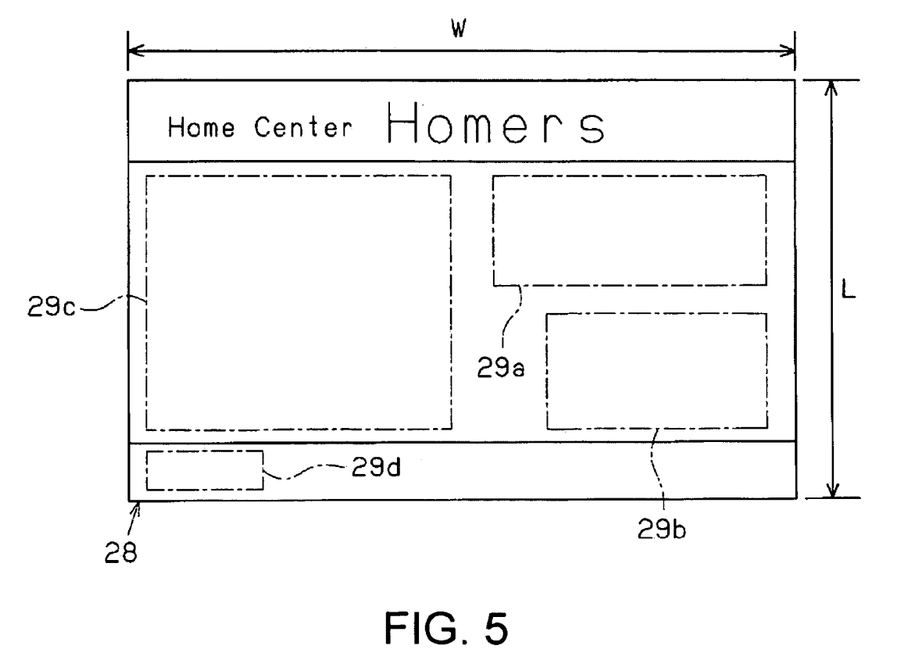
FIG. 5 is a schematic drawing showing a format of a shelf tag.

The format data storage section 24 stores format data (created format 28) for manufacturing the shelf tag. As shown in FIG. 5, the created format 28 includes a shelf tag size defining an aspect ratio of the shelf tag (vertical width L×lateral width W) and a layout area 29 defining printing positions of various data to be printed on the shelf tag set therein. In this example, layout areas 29a to 29d for printing the commercial product name 25b, the price 25c, the commercial product image 26, and the display position 27e are set on the shelf tag.

Figure 6:
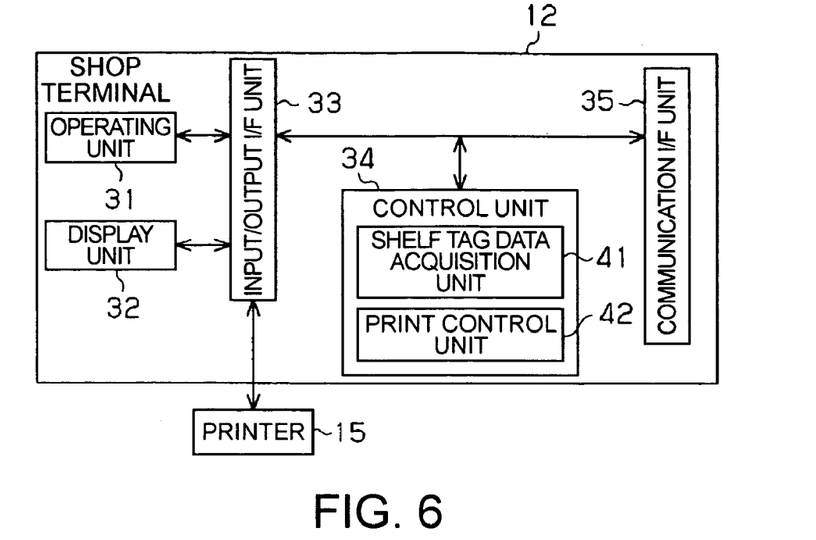
FIG. 6 is a block diagram showing a schematic hardware configuration of a shop terminal.
Figure 7:
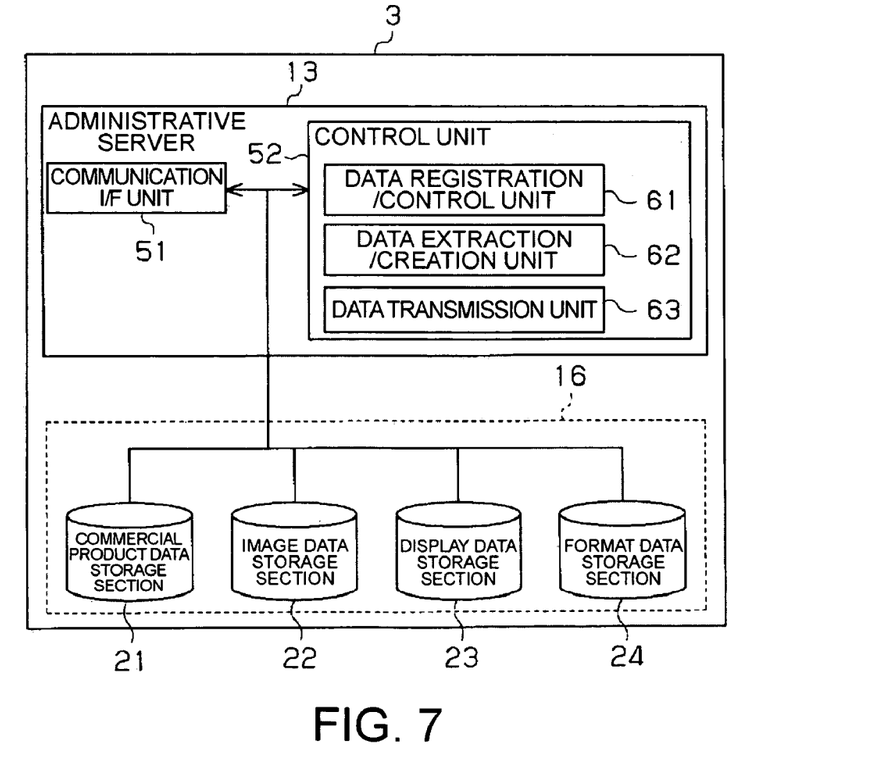
FIG. 7 is a block diagram showing a schematic hardware configuration of an administrative server.

Referring now to FIG. 6 and FIG. 7, a functional structure of the shop terminal 12 and the administrative server 13 relating to the shelf tag manufacturing system 1 according to this embodiment will be described.

FIG. 6 is a block diagram showing a schematic hardware configuration of the shop terminal 12.

The shop terminal 12 includes an operating unit 31, a display unit 32, an input/output I/F (interface, hereinafter) unit 33, a control unit 34, and a communication I/F unit 35.

The input/output I/F unit 33 controls the operating unit 31, the display unit 32, and data transmission with the printer 15. The operating unit 31 is composed of, for example, a keyboard 31a and a mouse 31b (see FIG. 1), and these are used for input of various data or instruction by a personnel of the shop 2. The display unit 32 is composed of, for example, a monitor 32a (FIG. 1) such as a CRT or an LCD, and displays a screen on which the personnel performs processing or a screen which shows a result of the processing. The communication I/F unit 35 controls communication between the shop terminal 12 and the network 14 via a communication device such as a router, not shown.

The control unit 34 is composed of a CPU, a ROM, a RAM, and so on, not shown, and includes a shelf tag data acquisition unit 41 and a print control unit 42 in terms of functional concept. A program for realizing the processing in the respective functional units 41, 42 is stored, for example, in the ROM, and the CPU executes the processing using the RAM as an operating area for buffer and the like according to a program stored in the ROM.

The shelf tag data acquisition unit 41 is a processing unit for acquiring image data of the shelf tag to be created (printed) (hereinafter referred to as "shelf tag data") from the administrative server 13. More specifically, in this example, the commercial product code 25a of the commercial product whose shelf tag is to be created is transmitted to the administrative server 13, the shelf tag data corresponding thereto is acquired from the administrative server 13 on the basis of the commercial product code 25a. Selection of the commercial product whose shelf tag is to be manufactured is achieved, for example, by acquiring a list of commercial products stored in the commercial product data storage section 21 and selecting the commercial product from the commercial product list by the personnel of the shop 2.

The print control unit 42 is a processing unit that converts the shelf tag data acquired by the shelf tag data acquisition unit 41 into print data that can be handled by the printer 15 and transmits the print data to the printer 15. In other words, the printer 15 performs a printing operation on a predetermined printing medium (in this example, roll sheet) on the basis of the print data supplied from the print control unit 42. Consequently, the shelf tag is manufactured. It is also applicable to provide such a function of the print control unit 42 on the printer 15 side, and convert the shelf tag data received by the shop terminal 12 into the print data on the printer 15 side.

FIG. 7 is a block diagram showing a schematic hardware structure of the administrative server 13.

The administrative server 13 includes a communication I/F unit 51, and a control unit 52. The communication I/F unit 51 controls both-way communication with the network 14 via the communication device such as the router, not shown. The control unit 52 is composed of the CPU, the ROM, the RAM, and so on, not shown, and in terms of functional concept, includes a data registration/control unit 61, a data extraction/creation unit 62, and a data transmission unit 63. A program for realizing processing in the respective functional units 61-63 is stored, for example, in the ROM, and the CPU executes the processing using the RAM as the operating area for buffer and the like according to the program stored in the ROM.

The data registration/control unit 61 is a processing unit that registers data to the database 16 and controls the registered data. More specifically, it executes registration of the commercial product data 25 to the commercial product data storage section 21, registration of the commercial product image 26 (image file 26a) to the image data storage section 22, registration of the display data 27 to the display data storage section 23, registration of the created format 28 to the format data storage section 24, and alteration and deletion of the data registered in the respective storage units 21-24. Calculation of the display position 27e of the commercial product on the basis of the display sequence 27c of the commercial product, the number of commercial products to be displayed 27d, and the commercial product dimension 25d is performed by the data registration/control unit 61. For example, when the display sequence 27c of the commercial product or the number of commercial product to be displayed 27d is to be altered, the data of the display position 27e is updated accordingly. In this example, the data registration/control unit 61 controls the data in the display data storage section 23 per shop on the basis of the shop code (not shown) received from the shop terminal 12.

The data extraction/creation unit 62 is a processing unit that extracts various data required for manufacture of the shelf tag from the database 16 in response to the shelf tag data acquisition requirement from the shop terminal 12 and creates shelf tag data on the basis of the extracted data. More specifically, in this example, on the basis of the commercial product code 25a received from the shop terminal 12, the commercial product name 25b and the price 25c of the commercial product are extracted from the commercial product data storage section 21, and the commercial product image 26 is extracted from the image data storage section 22. The display position 27e of the commercial product in the display shelf T is extracted from the display data storage section 23. In addition, the created format 28 for creating the shelf tag of the commercial product is extracted from the format data storage section 24. The extracted commercial product name 25b, price 25c, commercial product image 26, and display position 27e are arranged in the respective layout areas 29a-29d on the created format 28 respectively, whereby the shelf tag data is created.

The data transmission unit 63 is a processing unit for transmitting the shelf tag data created by the data extraction/creation unit 62 to the shop terminal 12.

Figure 8:
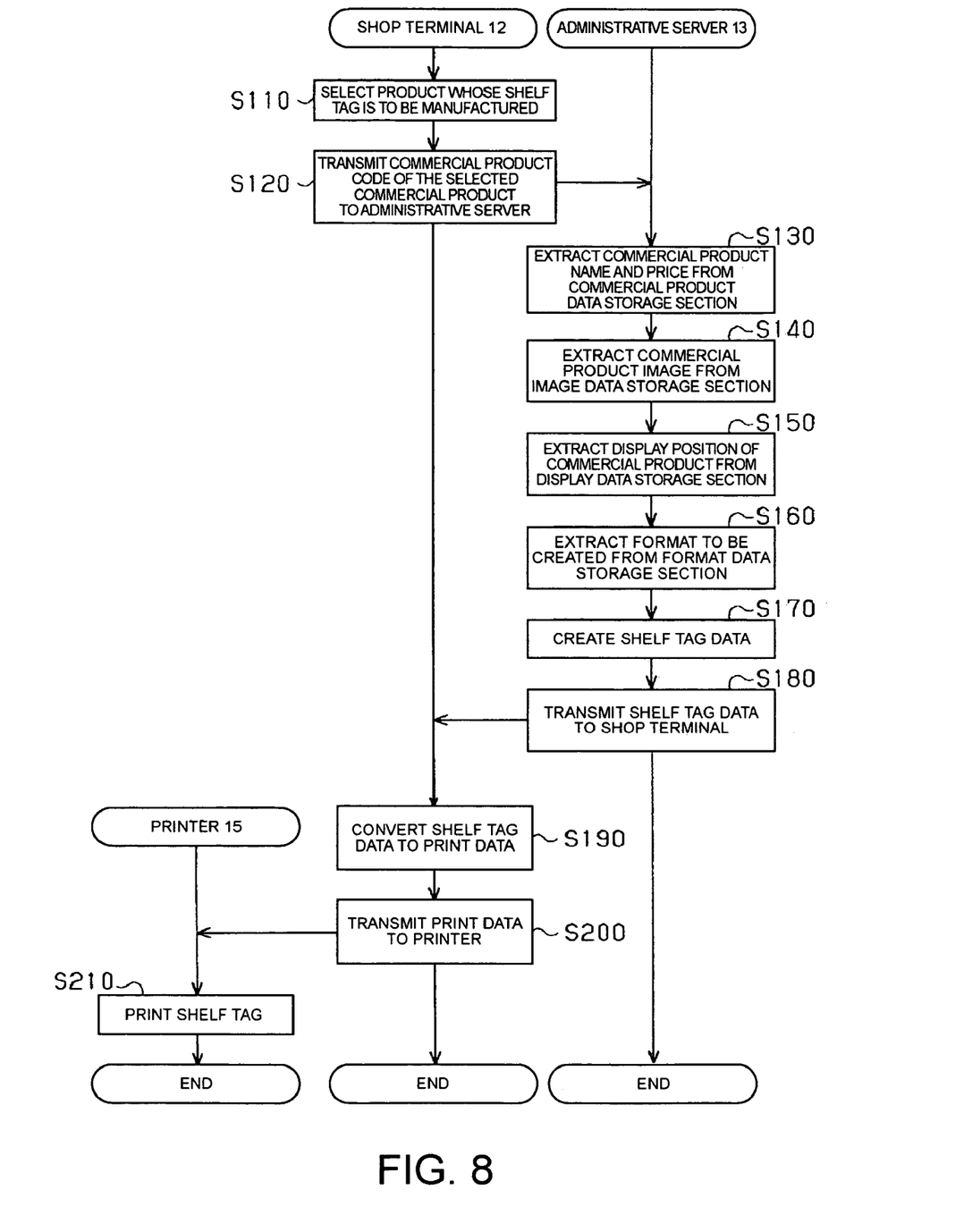
FIG. 8 is a flowchart showing a shelf tag manufacturing process.

Referring now to FIG. 8, a flow of the shelf tag manufacturing process by the shelf tag manufacturing system 1 according to this embodiment will be described.

FIG. 8 is a flowchart showing the shelf tag manufacturing process.

When the commercial product whose shelf tag is to be manufactured is selected by the personnel of the shop 2 in Step S110, the shop terminal 12 transmits the commercial product code 25a of the commercial product to the administrative server 13 to request acquisition of the shelf tag data.

The administrative server 13 extracts data required for creating the shelf tag data from the database 16 in Step S130 to Step S170 respectively upon reception of the commercial product code 25a from the shop terminal 12. In other words, the commercial product name 25b and the price 25c of the commercial product is extracted from the commercial product data storage section 21 in Step S130, the commercial product image 26 is extracted from the image data storage section 22 in Step S140, the display position 27e of the commercial product is extracted from the display data storage section 23 in Step S150, and the created format 28 of the shelf tag is extracted from the format data storage section 24 in Step S160. Then, the administrative server 13 creates the shelf tag data on the basis of the data extracted respectively from the respective storage sections 21-24 in Step S170, and the created shelf tag data is transmitted to the shop terminal in Step S180.

Upon reception of the shelf tag data from the administrative server 13, the shop terminal 12 converts the shelf tag data into print data that the printer 15 can process in Step S190, and then transmits the print data to the printer 15 in Step S200.

In Step S210, the printer 15 performs printing process on a predetermined printing medium on the basis of the print data received from the shop terminal 12. Accordingly, the shelf tag for the commercial product selected in Step S110 is manufactured.

Figure 10:
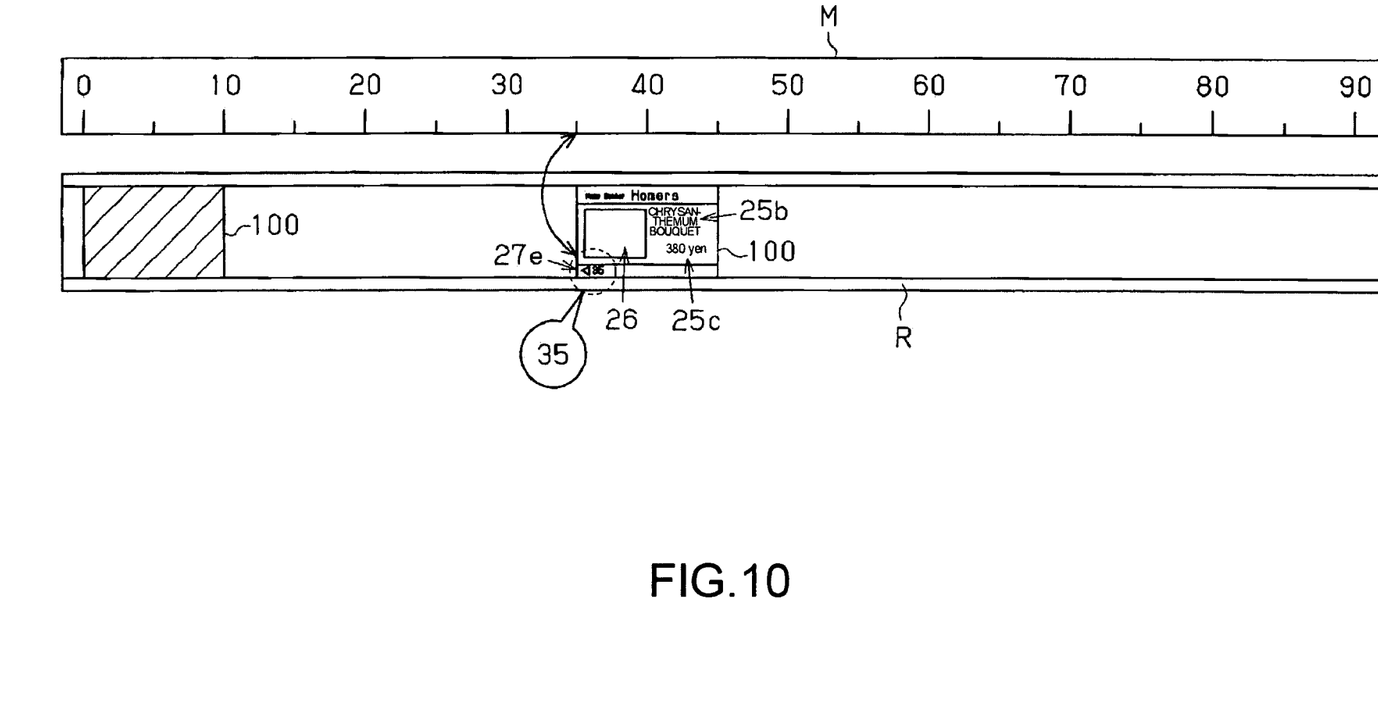
FIG. 10 is a pattern diagram showing how to attach the shelf tag.

Referring now to FIG. 9 and FIG. 10, a method of displaying the commercial product using the shelf tag manufactured by the shelf tag manufacturing system 1 according to the embodiment.

FIG. 9 is a pattern diagram showing a case in which three types of commercial products from G1 to G3 are displayed on the display shelf T. The commercial products G1 are products to be displayed on the leftmost position of the display shelf T (the left end in a state of viewing toward the display shelf), the commercial products G2 are products to be displayed on the right side of the commercial products G1, and the commercial products G3 are products to be displayed on the right side of the commercial products G2. Here, the shelf tag 100 of the commercial products G2 out of the shelf tags 100 manufactured for the commercial products G1 to G3 respectively will be described as an example.

As shown in the drawing, the shelf tag 100 includes the commercial product name 25b of the commercial products G2 (chrysanthemum bouquet in this case), the price 25c ("380 yen" in this case), the commercial product image 26, the display position 27e ("35 cm" in this case) printed thereon. The shelf tags 100 for the commercial products G1, G3 also includes the corresponding contents printed thereon.

In order to display the commercial products G2 using the shelf tag 100, firstly, the shelf tag 100 is attached to the rail R on the display shelf T. When attaching, as shown in FIG. 10, a scale M is placed on the rail R in the longitudinal direction, and the shelf tag 100 is attached to a position where the dimensional value of the display position 27e printed on the shelf tag 100 matches the dimensional value of the scale M (at a position 35 cm from the left end of the rail R). The scale M may be prepared by printing separately by the printer 15 or may be the one prepared in advance (measuring scale product or the like). After having attached the shelf tag 100 to the rail R, the commercial products G2 are displayed in sequence rightwardly of the display shelf T with reference to the position of the shelf tag 100. In other words, the position of the shelf tag 100 attached to the rail R on the basis of the display position 27e shows the position of the display start position of the commercial products G2. Therefore, by displaying the commercial products G2 with reference to the position where the shelf tag 100 is attached, the commercial products G2 can be arranged with high efficiency while figuring out the position to display the commercial products G2 accurately even when the display shelf T is not zoned for the respective types of commercial products G1-G3 in the row direction, or even when the commercial products G1-G3 are not arranged in sequence from the left end on the display shelf T.

As described above, according to the embodiment, the following advantages are achieved.

(1) The display position 27e that indicates the display start position in the row direction of the commercial products in the display shelf T is printed in the shelf tag 100. Therefore, even when the display shelf T is not zoned in the row direction, the commercial products can be displayed while figuring out the position where the products are to be displayed accurately on the basis of the position of the shelf tag 100 attached to the rail R. Therefore, the display work can be performed with high efficiency.

(2) The display position 27e to be printed on the shelf tag 100 is obtained on the basis of the commercial product dimension 25d and the number of commercial products to be displayed 27d which are arranged on the left side of the commercial products in question according to the display sequence 27c of the commercial products in question. Accordingly, even when the type of the commercial products to be displayed on the display shelf T is changed or when the sequence to display the commercial products or the number of commercial products to be displayed is changed, the display positions 27e of the respective commercial products can be obtained accurately each time. In other words, the position or the sequence to display the respective commercial products on the display shelf T can be flexibly changed according to the size or the number of inventories of the respective commercial products with easiness.

(3) In addition to the commercial product name 25b, the price 25c, the commercial product image 26 is also printed on the shelf tag 100. Accordingly, even for the commercial products which are difficult to distinguish, the commercial product can be distinguished at a glance by the commercial product image ~26. Therefore, the display work can be performed with high efficiency.

Second Embodiment

Subsequently, a second embodiment of the invention will be described mainly regarding different points from the first embodiment referring to FIG. 11. The same components as the first embodiment are represented by the same reference numerals for description.

In the second embodiment, the lateral width W (FIG. 5) of the shelf tag manufactured according to the first embodiment is enlarged to a length of the display range of the commercial product in the row direction, and other structures are substantially the same as the first embodiment.

Figure 11:
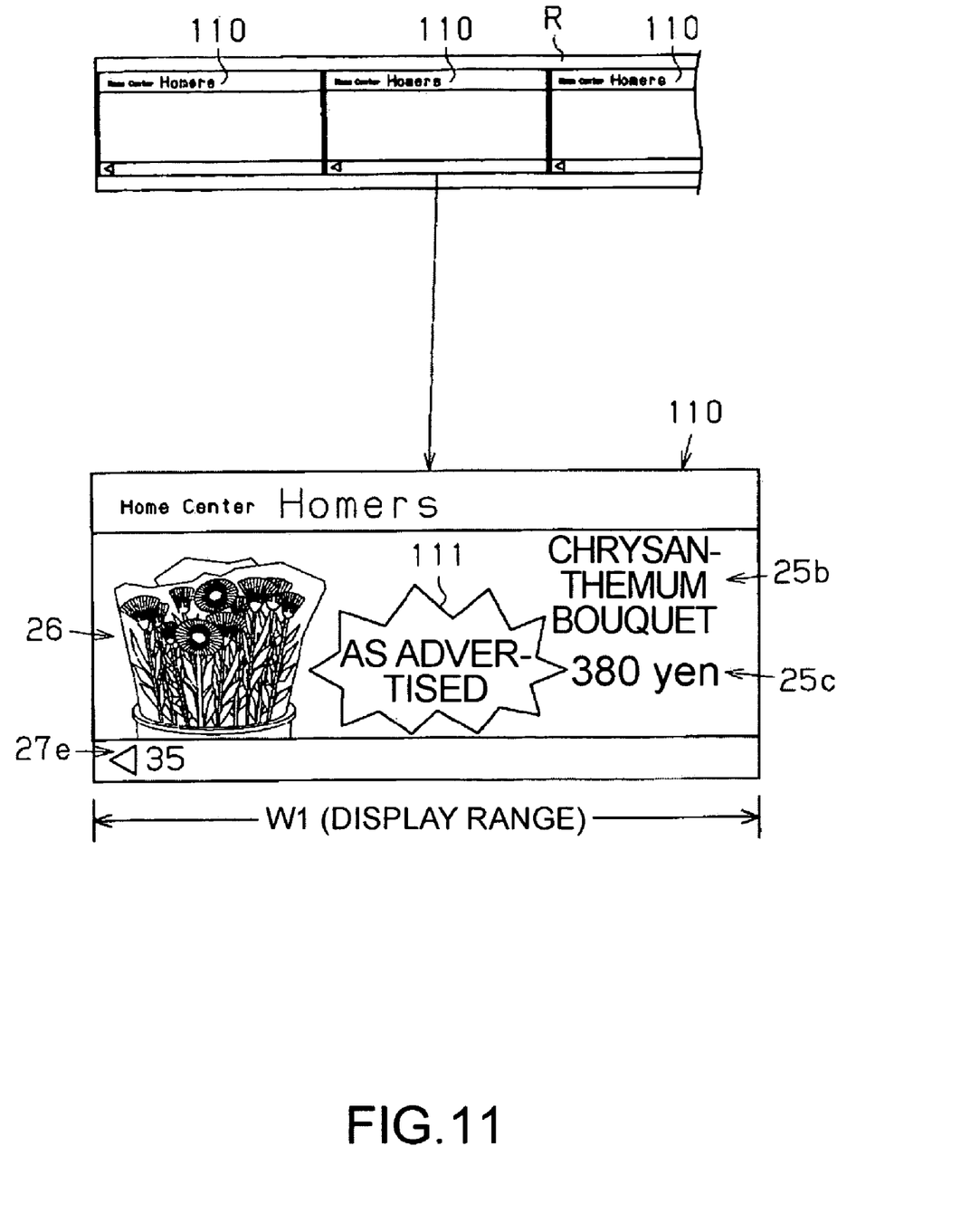
FIG. 11 is a pattern diagram showing the shelf tag according to a second embodiment.

In other words, as shown in FIG. 11, a shelf tag 110 in this embodiment is formed to have a lateral width W1 which corresponds to the length of the commercial product display range determined on the basis of the commercial product dimension 25d and the number of commercial products to be displayed 27d of the commercial product of the shelf tag 110. In this case, the respective shelf tags 110 are arranged in the rail R adjacently to each other. Even when the shelf tags 110 are formed as described above, the same advantages as in the previously described first embodiment are achieved.

In this shelf tag 110, it is also possible to provide advertisement information 111 as shown in FIG. 11 by using a space in the shelf tag 110. The advertisement information 111 in this case may be advertisement information which is specified (created) by the shop 2 side (for example, "advertised product", or the like) or may be advertisement information specified (created) by the manufacture side which supplies the commercial products (for example, introduction of other commercial products supplied by the manufacturer, and so on). In other words, by registering the advertisement information 111 in the database 16, for example, in association with the commercial products, and extracting the corresponding advertisement information 111 from the database 16 and printing the same when manufacturing the shelf tag 110, the space in the respective shelf tags 110 can be used effectively, and the shelf tag 110 having high added value can be manufactured.

Third Embodiment

Subsequently, a third embodiment of the invention will be described mainly regarding different points from the first embodiment referring to FIG. 12. The same components as the first embodiment are represented by the same reference numerals for description.

In the third embodiment, the shelf tags for one row of the display shelf T is combined into one and are manufactured (printed) in a lump.

Figure 12:
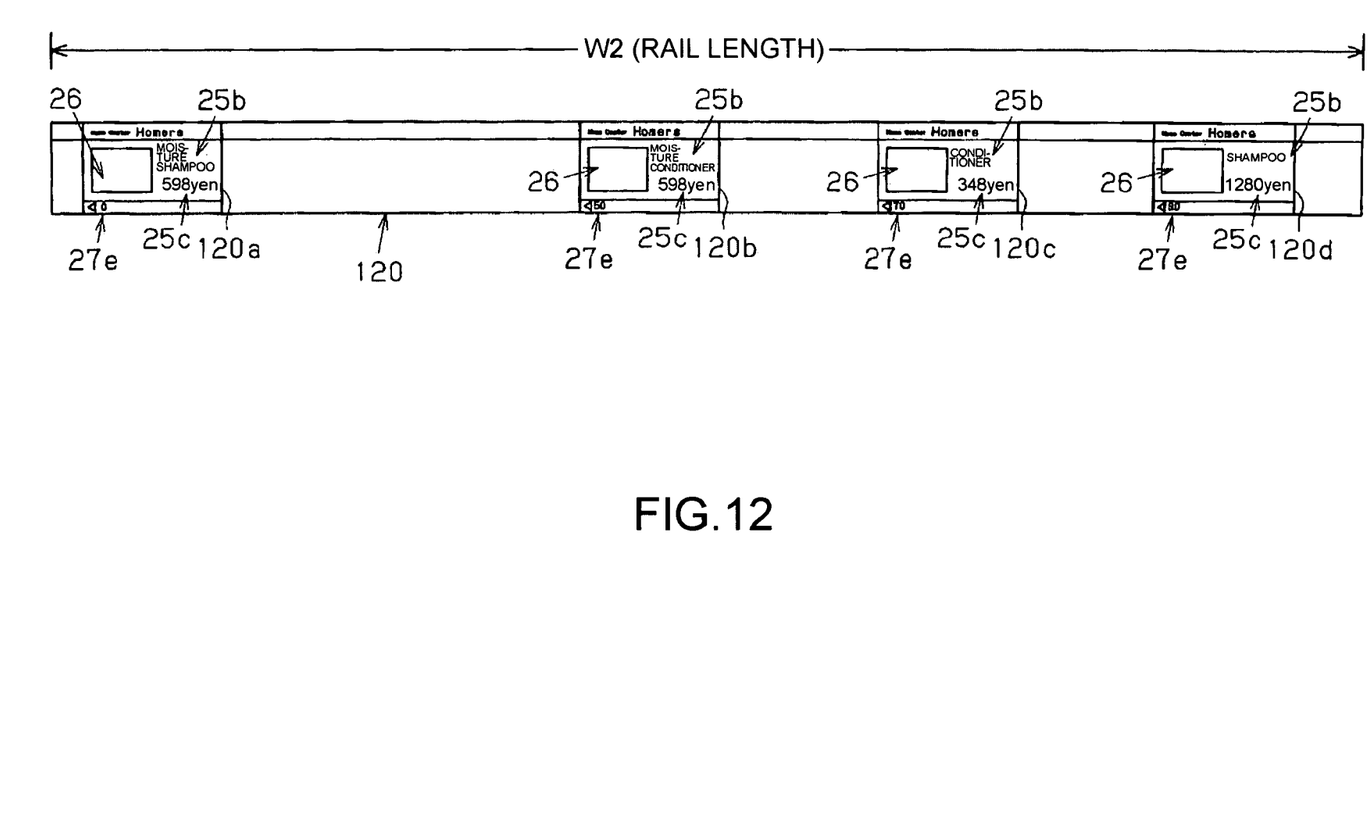
FIG. 12 is a pattern diagram showing the shelf tag according to a third embodiment.

In other words, as shown in FIG. 12, a shelf tag 120 in this embodiment is formed to be a long rectangular shape having a length of the rail R in lateral width W2 in a mode including all shelf tags 120a-120d for the respective commercial products (in the drawing, for example, for the four commercial products) to be displayed on one display shelf T. The shelf tags 120a-120d of the respective commercial products are arranged at positions corresponding to the display positions 27e of the respective commercial products in the longitudinal direction, and the left end positions of the respective arranged shelf tags 120a-120d correspond to the display start positions of the respective commercial products. By forming the shelf tag 120 in this manner, the same advantages as in the first embodiment can be achieved, and in addition, the shelf tags 120a-120d for all the commercial products to be displayed on one display shelf T can be printed in a lump. Therefore, attaching work of the shelf tag 120 to the rail R can be facilitated. In the case of the shelf tag 120 of a bulk printing type as in the embodiment, the display positions 27e to be printed on the respective shelf tags 120a-120d may be omitted.

In the above-described embodiments, an modification as follows may be employed.

Modification 1

In the shelf tag manufacturing system 1 described in the above-described embodiments, the function provided by the shop terminal 12 and the function provided by the administrative server 13 may be realized with a single computer (that is, only the shop terminal 12). In this shelf tag manufacturing system 1 may be realized by installing programs (shelf tag manufacturing program) for manufacturing the shelf tag 100 (or 110, or 120) in a plurality of computers, respectively. The shelf tag manufacturing program in the embodiments described above and the modification 1 is provided in a state stored in portable media such as a flexible disk or a CD-ROM, or a main storage device or an auxiliary storage device of another calculator connected via the network. The provided program is loaded from the portable media to the main storage device of the calculator directly, or copied or installed from the portable medium once to the auxiliary storage device, and then loaded to the main storage device for execution. In a case in which it is provided in a state stored in another device connected via the network, the program is received from another device in question via the network, then copied or installed into the auxiliary storage device, and then loaded to the main storage device for execution.

Modification 2

The advertisement information 111 to be printed on the shelf tag 110 in the second embodiment described above may be printed on the shelf tag 100 in the first embodiment, or on the shelf tag 120 in the third embodiment.

Modification 3

In the respective embodiments described above, the commercial products are displayed in sequence from the left end with reference to the left end of the display shelf T (the left end viewed toward the display shelf T). However, a mode in which the commercial products are displayed in sequence from the right end with reference to the right end as a reference position.

Modification 4

The dimensional value indicating an absolute position from the left end of the display shelf T is printed as the display position 27e in the above-described embodiments. However, it is also possible to print a dimensional value showing a relative position between the adjacent commercial products as the display position 27e. In this case as well, the value of the display position 27e for the commercial products to be displayed on one end (the left end or the right end) as the reference position in the display shelf T is also "0 cm".

Modification 5

In the embodiments described above, the commercial product name 25b, the price 25c, the commercial product image 26, the display position 27e are printed on the shelf tag 100 (or 110, or 120). However, at least the commercial product name 25b, the price 25c, and the display position 27e have only to be printed. In addition to these items, other information may be printed as well.

Modification 6

In the above-described embodiments, the data required for manufacturing the shelf tag 100 (or 110, or 120) is extracted from the database 16 on the basis of the commercial product code 25a, and the shelf tag data is manufactured on the basis of the extracted data. However, it is also possible to create the shelf tag data corresponding to the respective commercial products in advance and register the same to the database 16.

Modification 7

In the above-described embodiments, the shelf tag data is created on the administrative server 13 side. However, it is also possible to transmit the data extracted from the database 16 to the shop terminal 12, and create the shelf tag data on the shop terminal 12 side.

Modification 8

In the above-described embodiments, the commercial product is selected to manufacture the shelf tag 100 (or 110, or 120) for the commercial product in question. However, it is also possible to adapt to select the display shelf T to manufacture the shelf tag for the respective commercial products to be displayed on the display shelf T in question. In this case, the required data is extracted on the basis of the shelf number 27a registered in the display data 27.

Modification 9

In the above-described embodiment, it is also possible to change a background color of the shelf tag 100 (or 110, or 120) to be printed or add a background pattern on the base. In other words, by registering a background data for setting a background design in the database 16 in association, for example, with the commercial product or the display shelf and differentiating the background colors or the background patterns for each commercial product, each display shelf, or each commercial product supply manufacturer, the commercial product to be displayed on the display shelf or the manufacturers can be distinguished at a glance. Accordingly, efficiency of the display work can be improved, and the shelf tag 100 (or 110, or 120) with higher added value can be manufactured.

Modification 10

In the above-described embodiments, it is possible to perform simulation of the commercial product display on the basis of the display data 27 registered in the database 16 before manufacturing the shelf tag 100 (or 110, or 120). By manufacturing the shelf tag 100 (or 110, or 120) after having performed such simulation, the efficiency of display work can further be improved.

Modification 11

Design-related items in the structure stated in the embodiments or the respective modifications described above may be modified as needed within the scope of the technical idea of the invention.

The entire disclosure of Japanese Patent Application No:2005-033296, filed Feb. 9, 2005 is expressly incorporated by reference herein.

What is claimed is:

1. A shelf tag to be attached to a display shelf for displaying commercial products, comprising: a commercial product name and a price of the commercial product and a dimensional value indicating a display position of the commercial product to be displayed in a row direction on the display shelf printed on the tag, wherein the display position corresponds to a display sequence of the commercial products to be displayed on the display shelf in the row direction, a number of commercial products to be displayed on the display shelf, and a width of the commercial product, and wherein a lateral width of the shelf tag corresponds to a width of the commercial product display range in the row direction on the display shelf determined on the basis of the width of the commercial product and the number of commercial products to be displayed on the display shelf.

2. The shelf tag according to claim 1, wherein the dimensional value indicating the display position of the commercial product is an absolute position from one end of the display shelf in the row direction or the dimensional value indicating a relative position between the adjacent commercial products.

3. The shelf tag according to claim 1, wherein advertisement information of a shop that sells the commercial product or a manufacturer that supplies the commercial product is further printed on the shelf tag.

4. The shelf tag according to claim 1, wherein background patterns or background colors set according to the commercial products, the display shelves, or manufacturers that supply the commercial products are printed on the shelf tag.

5. The shelf tag according to claim 1, wherein an image of the commercial product is further printed on the shelf tag.

6. The shelf tag according to claim 1, wherein the shelf tag is manufactured using a roll sheet as a printing medium.

7. A shelf tag to be attached to a display shelf for displaying commercial products, the shelf tag being formed into an elongated rectangular of a length corresponding to a row of the display shelf and comprising at least commercial product names and prices of a plurality of the commercial products for one row that are to be displayed on the display shelf in the row direction, at least the commercial product names and prices being printed at positions corresponding to display positions where the respective commercial products are to be displayed, wherein the display position of the commercial products to be displayed in a row direction on the display shelf correspond to a display sequence of the commercial products to be displayed on the display shelf in the row direction, a number of commercial products to be displayed on the display shelf, and a width of the commercial products, and wherein a lateral width of the shelf tap corresponds to a width of the commercial product display range in the row direction on the display shelf determined on the basis of the width of the commercial Products and the number of commercial products to be displayed on the display shelf.

8. The shelf tag according to claim 7, wherein advertisement information of a shop that sells the commercial product or a manufacturer that supplies the commercial product is further printed on the shelf tag.

9. The shelf tag according to claim 7, wherein background patterns or background colors set according to the commercial products, the display shelves, or manufacturers that supply the commercial products are printed on the shelf tag.

10. The shelf tag according to claim 7, wherein an image of the commercial product is further printed on the shelf tag.

11. The shelf tag according to claim 7, wherein the shelf tag is manufactured using a roll sheet as a printing medium.

12. A shelf tag manufacturing system for manufacturing shelf tags to be attached to a display shelf for displaying commercial product, comprising:

means for calculating a display position of the commercial product to be displayed in a row direction on the basis of a display sequence of the commercial products to be displayed on the display shelf in the row direction, the number of commercial products to be displayed, and dimension of the commercial product;

means for creating shelf tag data including at least names and prices of a plurality of commercial products to be displayed on the display shelf in one row arranged at positions corresponding to the display positions of the respective commercial products in a length corresponding to one row of the display shelf;

means for converting the shelf tag data into print data; and means for printing the shelf tag on the basis of the print data;

wherein a lateral width of the shelf tags corresponds to a width of a commercial product display range in the row direction on the display shelf determined on the basis of a width of the commercial products and the number of commercial products to be displayed on the display shelf.

* * * * *